Sept. 7, 1948.        R. O. WALKER        2,448,560
METHOD OF FORMING SCREENS FOR THE
RECEPTION OF PROJECTED IMAGES
Filed Oct. 5, 1944
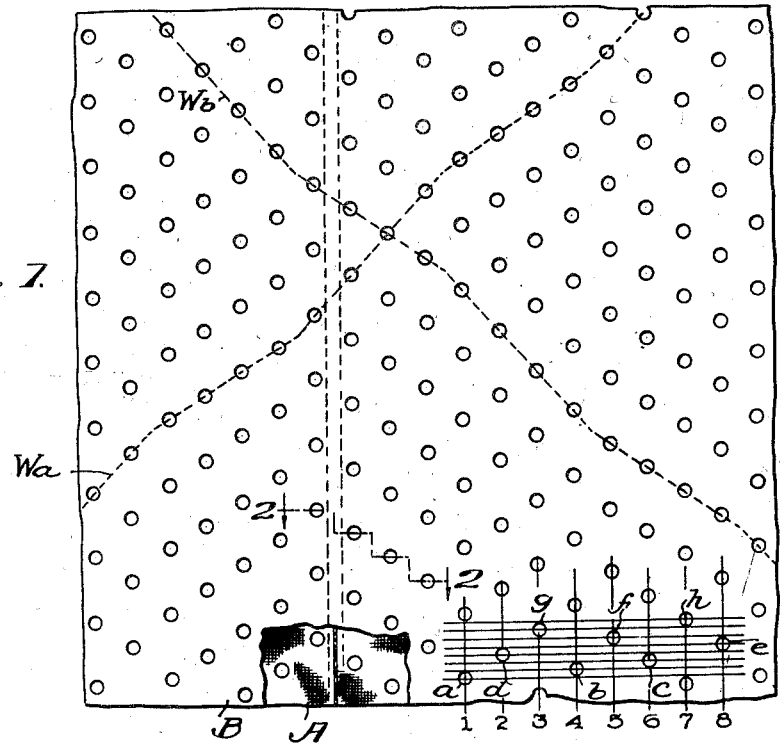
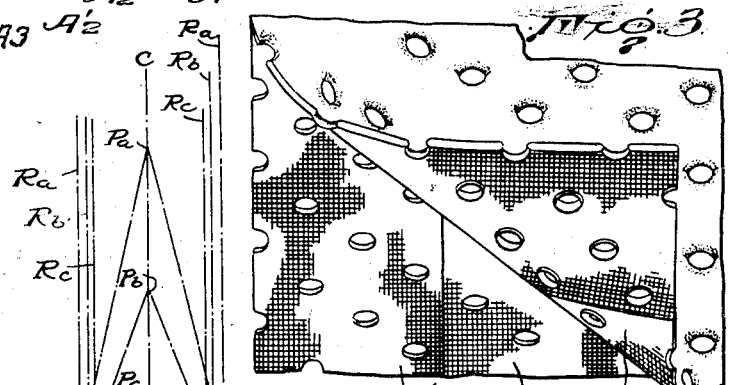
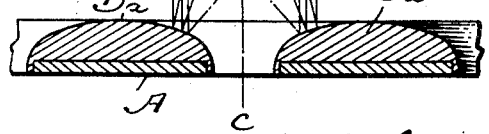
Inventor
Robert O. Walker
By Emery, Varney, Whittemore + Dix
Attorney Patented Sept. 7, 1948

2,448,560

UNITED STATES PATENT OFFICE 2,448,560

METHOD OF FORMING SCREENS FOR THE RECEPTION OF PROJECTED IMAGES

Robert O. Walker, Hartsdale, N. Y.

Application October 5, 1944, Serial No. 557,309

5 Claims. (Cl. 88—28.92)

1

This invention relates to the method of manufacturing an improved product for reflecting light and shadows in a more efficient manner whereby the reflection is more diffuse and the amount of light reflected at large angles from the axis of the source of light is greatly increased.

One of the more highly technical uses of this improved product is when it is constructed as a motion picture screen for use in theatres and elsewhere. One of the great advantages of this improved product as a motion picture sceren is that the persons sitting in the side seats of the theatre see the picture with substantially full light and with reduced lengthening or foreshortening.

One of the features of the invention is an improved light-reflecting screen for use in a picture projecting system which exhibits a marked illusion of depth or perspective in the reflected image or picture.

A further feature of the light-reflecting screen of the present invention is that the apparent distortion of the reflected image at wide angles of observation is materially reduced.

This application is in part a continuation of my copending application Serial No. 375,854, filed January 24, 1941, now Patent No. 2,366,761. The earlier filed application covers the structure of the improved screen while the present application is concerned with the method of manufacture of the screen.

Other features, objects and advantages will become clearly apparent during the review of the more detailed description to follow.

The invention will be described in connection with the accompanying drawings in which Figure 1 is an enlarged face view of a fragmentary portion of the improved screen made according to the present invention and showing a portion of the reflecting surface broken away to illustrate a seam construction in the backing or supporting sheet;

Figure 2 is a sectional view of Figure 1 taken along the line 2—2 but shown on a greatly enlarged scale;

Figure 3 is a face view of a fragmentary part of the screen showing a portion of the reflecting coating peeled away from the backing sheet; and Figure 4 is a sectional view of an elementary part of the screen taken through the center of one of the apertures in the screen.

There is shown in Figures 1 and 2 one possible construction of the improved motion picture screen, but it will be understood that the invention may be used to produce other constructions than the one shown in the drawing. Figure 1 is a front view of a fragmentary part of the screen representing a square area measuring about two inches on one side. The screen is provided with a perforated backing sheet or support represented at A, which may be formed of any suitable material such as cotton drill but other flexible materials may be used if desired. The backing sheet is covered on its front face with a coating of plastic material represented at B.

In the case of large motion picture screens it is not always convenient to form the backing sheet of one piece, and the sheet may be formed of two or more pieces joined together as described hereinafter. A suitable material for the backing sheet is cotton drill, weighing 0.529 pound per square yard and 59 inches wide. In building up the backing sheet a number of strips of cloth of an aggregate width sufficient to make up the desired width of screen are first impregnated with a solution (such as 95% water and 5% starch) to bond the fibers together and produce clean-cut apertures when the strips are later perforated. The strips are next coated on the back with a thin coat of plastic compound preferably containing a pigment and a plasticizer, this coating being applied by means of a standard artificial leather coating machine and being driven into the cloth by a very sharp coating knife so that the back of the cloth is left roughened to break up unwanted reflections of sound originating from the rear of the screen. The stiffened strips of cloth are next perforated in a standard crank-press perforating machine so that the strips are perforated with any suitable series of holes, preferably distributed in accordance with the design or pattern shown in Figure 1. As will be seen, the holes are arranged in two sets of waves or undulations running diagonally from left to right and from right to left. In Figure 1 dashed line Wa indicates one wave in one set of diagonal waves while line Wb indicates a wave in the other set of diagonal waves. This arrangement results in a chevron pattern produced by two sets of waves. It will be observed that the perforations are arranged in vertical rows with equal horizontal spacing between rows and with equal vertical spacing between the holes in the different rows, but adjacent vertical rows are staggered in vertical position with respect to each other to produce the particular pattern shown. The purpose of arranging the holes in accordance with this pattern is to reduce the reticulation of the image which would otherwise be observed if the holes were arranged to lie in straight lines horizontally as well as straight lines vertically and diagonally, or in accordance with any other simple geometrical arrangement. It will be observed that when the pattern is viewed in a direction normal to the plane of the drawing, the eye is not conscious of the fact that the holes are arranged in straight vertical lines, or in any definite pattern, but the holes appear to be uniformly distributed throughout the area.

The particular arrangement or pattern for the perforations as shown in Figure 1 is simply for the purpose of illustration, and it will be understood that there are many other possible arrangements which will secure the desired result. The particular pattern shown is developed from a unit design consisting of eight perforations spaced within a unit area covered by eight parallel horizontal lines shown in the lower right hand corner of Figure 1. As will be seen, the unit area of the design is ruled by equally spaced vertical lines numbered 1 to 8 inclusive in addition to the eight horizontal lines. The eight perforations included within the unit area of the design are located at certain points of intersection of the two sets of lines, and by referring to Figure 1 it will be seen that the perforations a, b, c, d, e, f, g and h positioned on successive horizontal lines from bottom to top of the area are arranged at the intersections of the horizontal lines and vertical lines 1, 3, 7, 5, 2, 8, 4 and 6 respectively. The unit design just described is repeated throughout the area of the backing sheet, and it is clear the perforating punch and die need be only as large as the unit area.

The perforations should be of such size and density that when the screen is viewed from a point in front of its center, at a distance about equal to the width of the screen, the apertures will not be visible. For moving picture theatre screens it is found that satisfactory results are obtained when the perforations have a diameter of about 3/64 of an inch and a density of about 28 perforations per square inch of screen area. The perforations are widely separated by comparison with their diameter. As shown in Figure 1, the smallest distance of separation is greater than twice the diameter of the perforations; thus the holes are separated by relatively wide flat areas of the sheet.

After the stiffened strips of backing cloth have been perforated the strips are joined together along their vertical edges in the following manner:

Two adjacent strips are superimposed with their faces in contact with each other and their edges matched. A seam is then sewed along one edge of matched strips so that the seam is parallel to the outer row of holes and is spaced from the outer row a distance equal to one-half the distance of separation between adjacent vertical rows of holes. After sewing, the two strips are separated and flattened out into a common plane and the pattern or arrangement of the holes will continue unbroken from one strip to the adjacent strip. Upon flattening out the seam the two seam flaps are turned back and creased against the respective strips as shown in Figure 2 where A1 represents one strip; A2 represents an adjacent strip sewed to strip A1 by the stitches A3, and the seam flaps A'1 and A'2 lie flat against their respective strips.

The cloth forming the backing sheet or support may be retained in a single strip through the impregnating and perforating treatment, and then cut into separate pieces and sewed together. A suitable sizing solution has already been given, and a suitable solution for impregnating the back of the sheet may be a standard artificial leather solution. This coating on the back is approximately 0.001 inch thick, and it also aids in bonding the fibers of the cloth together to produce clean-cut apertures in the cloth when perforated. If desired, one or more coats of the same artificial leather compound may be applied to the front face of the cloth before the cloth is passed through the perforating machine.

After the strips have been assembled to form the backing sheet, the sheet may next be provided with a reinforcing border preferably consisting of a strip of artificial leather approximately five inches wide which is doubled over around the outer edge of the backing sheet and cemented to the face and back of the edge portions of the sheet. Suitable grommets are provided at spaced points around the outer edge of the border for lacing the backing sheet in a suitable framework to hold the backing sheet in a flat position during subsequent operations.

For the purpose of applying a suitable coating B to the face of the mounted backing sheet, the supporting frame is usually placed in horizontal position with the front surface of the sheet on top. The upper surface of the backing sheet is then coated uniformly with plastic material in any suitable condition but preferably in liquid form which upon drying forms a relatively hard, smooth surface on the front of the screen. One suitable composition for the plastic coating B may be: phthallic anhydride 20%; titanium dioxide (pigment) 20%; triphenyl phosphate 20%; and toluol (solvent) 40%. This mixture may be applied hot and maintained at a temperature of 140° F. during the coating process. I prefer to apply the plastic material to the sheet by spraying the material on the sheet in a finely divided spray. For the purpose of securing a uniform coating, the spray gun is mounted upon the movable carriage of a gantry arranged to span and traverse the backing sheet on tracks which run parallel to one dimension of the backing sheet, and the gantry and the movable carriage are operated so as to cause the spray gun to traverse the surface of the backing sheet in parallel runs, each run being displaced from the other by a predetermined distance at right angles to the direction of the run until the entire surface of the sheet is covered in a uniform manner. This method of spraying the surface of the sheet is substantially like the operation of an electron gun in scanning an image in a television system. In practice, it has been found that the scanning lines for forming the base coatings may be separated a distance of the order of two inches and the finishing coat may be applied in scanning lines having a distance of separation of the order of one inch. The gantry is driven at a constant speed by any suitable source of power and is controlled by suitable apparatus well known to those skilled in the art.

The improved reflecting properties of my screen are secured by the rapid application of successive layers of coating material forming the coating B. Each successive layer must be applied before the previous layers have dried or hardened. If each layer is permitted to harden before the next layer is applied, the desired curvature of the surface around each aperture will not be obtained. By properly controlling the width of the spray and the separation of the scanning lines, it is possible to coat a number of layers in one scanning operation. For example, if the width of the spray on the surface of the sheet is eight inches, and the distance of separation between adjacent runs of the spray gun is one inch, then eight layers will be applied to the surface during one complete scanning of the screen. It is possible to apply a number of layers in one scanning operation and to allow these to dry before applying the same number of layers in another scanning operation, but better results are obtained if the total number of layers are applied without allowing the earlier layers to dry or harden before the final layers are applied. In actual practice I have secured good results by applying eight layers in rapid succession in one scanning operation and then repeating the same operation to apply eight additional layers before the first layers have hardened. It will be understood that more than two scanning operations may be applied and the number of layers applied by each scanning operation may be varied.

The backing sheet is coated with a number of layers of liquid coating compound, the layers being applied in rapid succession as described above. Air pressures employed on the spray gun may vary from fifty pounds to two hundred and fifty pounds and may be set as desired to have one substantially constant pressure during one application. The force of the spray will maintain the holes free of plastic material except for a ring of material which will adhere to the inner walls of the holes. A sufficient number of coats of plastic material are applied to the upper surface of the sheet to build up the coating to a thickness such that after drying the plastic coating will present a smooth surface which does not show any of the surface irregularities of the backing sheet. Since adjacent runs of plastic material overlap each other, it is possible by controlling the separation of the runs to secure the desired thickness of coating with only one scanning operation, but I prefer to use two or more scanning operations as explained above.

Simply by way of illustration it has been found that in using a backing sheet formed of cotton drill having a thickness of approximately 0.010 inch, a satisfactory surface is provided where the coating is built up to a thickness of approximately 0.025 inch.

After the desired number of coatings or layers of plastic material are applied to the face of the backing sheet, the material is allowed to dry into a relatively hard, smooth flexible coating, and it will be found that the surface tension of the plastic material when in a liquid state will maintain the plastic material in a form which, upon drying, results in the formation of flaring apertures arranged centrally of the holes in the backing sheet and illustrated in Figure 2. From this figure, it will be seen that each hole is lined with a ring of plastic material extending to the back surface of the backing sheet, and the surface of the plastic material surrounding each hole is smoothly flared outwardly until the flaring surfaces merge into each other on the extreme front surface of the screen. As will be seen from Figure 2, the apertures in the plastic coating have generally the shape of a "morning glory" blossom, and the cross-section of the screen lying between adjacent holes or apertures is shaped generally in the form of a semi-ellipse having its major axis lying in the plane of the black surface of the backing sheet. These semi-elliptical areas are the cross-hatched areas $Ba$ shown in Figures 1 and 4.

The shape of the curved surfaces forming the flaring apertures is represented by a toric curve and the shape may be controlled to a certain extent by controlling the composition of the plastic compound applied to the sheet. The shape of the curve is controlled mainly by the surface tension of the plastic compound in a liquid state and by the air pressure blowing the plastic through the holes. The surface tension will be controlled by varying the relation between the solids content and the amount of solvents, plasticizers, pigments and other constituents. Also, the surface tension is influenced by the temperature, the air pressure, the pressure upon the liquid deposit, the nature of the solvents, and to some extent the nature of the pigment.

By selecting the proper pigment mixed with the liquid material forming the coating B, it is possible to use the coating as the light-reflecting surface for the screen, but the desired reflecting surface may be obtained by applying a further coating to the hard plastic coating to serve as a light-reflecting surface, especially where it is desired to provide a fluorescent surface on the front of the screen. A suitable fluorescent surface may be obtained by applying a thin coating of a transparent plastic into which a fluorescent salt has been dispersed by grinding or in any other manner. A suitable surface may also be obtained by applying a thin coating of liquid plastic over the front face of the screen and then insulphating or dusting the fluorescent salt or powder upon the surface while in a liquid state and permitting the fluorescent material to become imbedded in the plastic upon drying. The final finish coat need not have a thickness greater than one ten-thousandths of an inch and will not cause any appreciable variation in the curvatures of the apertures in the screen. The fluorescent coating may be selected to fluoresce instantly with quick extinction, or it may be selected for delayed fluorescence so that the image may continue visible for a part of the time when the shutter interrupts the projecting beam. The fluorescent coating may also be selected to respond to ultra-violet rays as well as visible rays.

The fluorescent material may be added to the liquid plastic which is to form the coating B, thus avoiding the application of a further coating after the plastic coating has been formed, but, from consideration of cost and ease of production, it is preferred to apply the fluorescent material as a final coating as described above.

Figure 3 shows a part of the screen with one corner of the plastic coating B peeled away from the backing sheet A and exposing a seam between adjacent strips of the backing sheet. This figure is made from a photograph of an actual structure and is intended to illustrate the monolithic or integral character of the plastic coating and the manner in which it completely masks out all surface irregularities and seams of the backing sheet. The rings of plastic material which line the walls of the apertures in the backing sheet are shown on the back side of the coating B.

In using the improved screen as a reflecting surface in a picture projecting system, the screen is freely supported in a suitable frame in a generally vertical position, and the picture image is projected on the face of the screen in the usual manner.

The light rays which fall upon the substantially flat portions of the screen lying in the regions about midway between the various apertures are reflected from the screen and produce an image of the picture practically in the plane of the front face of the screen in the usual manner. Other light rays, which fall on the curved surfaces of the flaring apertures or depressions, are reflected from the screen at varying angles depending upon the angle of the surface at the point of impact of each light ray, and the resulting effect of all of the reflections from the entire area of the screen appears to produce a marked illusion of depth in the observed image.

This illusion is clearly apparent in the actual use of the screen, and while the action of the light rays in producing the effect is probably not a simple matter, it is believed the following explanation will at least in part explain this effect:

While the light rays in the beam of a picture projector are not parallel to each other, but diverge from the axis of the beam by different angles in different parts of the beam, the following explanation of the action of the screen is based on the assumption that the projected rays are all parallel to the axes of the apertures which are parallel to each other. Certain of the rays falling on the aperture surface, and especially the rays which fall upon the outer flaring portion of the aperture surface, are reflected back in front of the screen and are focused along the axis of the aperture at varying distances from the front surface of the screen. This is clearly illustrated in Figure 4 where one flaring aperture is shown having an axis represented by the line C—C. A substantial portion of the projected light rays which fall upon the aperture surface at points equidistant from the axis C—C, such as the rays $R_a$, $R_a$ in Figure 4, are reflected back and are concentrated or focused at the point $P_a$ on the axis C—C. In a like manner, a substantial portion of the rays which fall upon points at an equal distance from the axis but nearer to the axis as in the case of the rays $R_b$, $R_b$ are reflected and are focused at the point $P_b$ on the axis C—C. Rays falling still nearer the center of the aperture such as the rays $R_c$, $R_c$ are focused at the point $P_c$ in front of the screen and on the axis C—C.

It will thus be seen that a substantial portion of the rays which fall upon the curved surface of each aperture are reflected back and focused at points on the axis of the aperture at varying distances in front of the screen.

As explained above, the foregoing explanation is on the assumption that the projected rays $R_a$, $R_b$, $R_c$ are parallel with the axis of the aperture C—C, and strike the screen at right angles to the plane of the screen as shown in Figure 4. Under this condition, the line of greatest concentration of the reflected rays, that is, the line including points $P_a$, $P_b$, $P_c$ is coincident with the aperture axis. In practice the projected rays striking different sections of the screen, especially at the outer portions, will not be parallel to the axes of the apertures, due either to the screen being tilted somewhat from a position normal to the axis of the beam or to the divergence of the rays in the beam, and the focusing action will be somewhat different, but the same general action takes place. Since each aperture is symmetrical about its axis, certain of the rays reflected from the flaring surface surrounding each aperture will be reflected and will intersect the axis of the aperture at points lying in front of the screen. It will also be understood that since the surface of the screen preferably will not be of mirror-like smoothness, there will be a certain amount of diffusion of the reflected light which may be varied from the diffuse to the specular by different surface treatments known to those skilled in the art. For each pencil of light rays striking an elementary area of the screen surface, a certain portion of the rays will be reflected along the major axis of reflection determined by the angle of incidence of the projected rays, while other rays will be reflected at varying angles from the major axis of reflection. When the projected light rays are normal to the screen, and the axes of the apertures are also normal to the screen, the major axes of reflection from points on the flaring surface of each aperture at different distances from the center of the aperture will focus substantially on the axis of the aperture at varying distances in front of the screen.

While the preferred method of coating the backing sheet is to support it horizontally with the front face on the top, it is possible to support the sheet horizontally with the front face on the bottom and to apply the coating B by spraying from below. The coating operation in this case is the same as that described above except that the sprary is directed upwardly instead of downwardly.

I claim:

1. The method of forming a projection screen which consists in providing a sheet of closely woven fabric, impregnating said sheet with a sizing solution to stiffen the sheet, punching round holes throughout the area of said sheet with relatively wide separation, supporting said backing sheet in a horizontal plane, spraying upon one face of said sheet a coating of liquid plastic material and building up said coating in liquid state to a thickness which upon drying forms a smooth, outwardly flaring, light-reflecting surface symmetrically arranged around each aperture, and the flaring surfaces surrounding adjacent apertures merge into each other without substantially any intermediate flat surface.

2. The method of forming a projection screen which consists in providing a sheet of closely woven fabric, impregnating said sheet with a sizing solution to stiffen the sheet, applying to the back of said sheet a coating of artificial leather solution to increase the stiffness of said sheet, punching round holes throughout the area of said sheet with relatively wide separation, supporting said backing sheet in a horizontal plane, spraying upon one face of said sheet a coating of liquid plastic material and building up said coating in liquid state to a thickness which upon drying forms a smooth, outwardly flaring, light-reflecting surface symmetrically arranged around each aperture, and the flaring surfaces surrounding adjacent apertures merge into each other without substantially any intermediate flat surface.

3. The method of forming a projection screen which consists in providing a sheet of closely woven fabric, impregnating said sheet with a sizing solution to stiffen the sheet, punching round holes throughout the area of said impregnated sheet with relatively wide separation between holes, supporting said backing sheet in a horizontal plane, spraying upon one face of said sheet a coating of liquid plastic material to a thickness which upon drying forms a smooth, outwardly flaring, light-reflecting surface symmetrically arranged around each aperture, and the flaring surfaces surrounding adjacent apertures merge into each other without substantially any intermediate flat surface.

4. The method of forming a projection screen which consists in providing a sheet of closely woven fabric, coating at least one face of said sheet with a liquid bonding material to bond the fibers of the sheet together, punching round holes throughout the area of said coated sheet with relatively wide separation between holes, supporting said backing sheet in a horizontal plane, and applying to one face of said sheet a coating of liquid plastic material to a thickness which upon drying forms a smooth, outwardly flaring, light-reflecting surface symmetrically arranged around each aperture, and the flaring surfaces surrounding adjacent apertures merge into each other without substantially any intermediate flat surface.

5. The method of forming a projection screen which consists in providing a sheet of closely woven fabric, coating at least one face of said sheet with a liquid bonding material, mechanically working said bonding material into said sheet to effect bonding of the fibers of said sheet together upon hardening of said bonding material, punching round holes throughout the area of said coated sheet with relatively wide separation between holes, supporting said backing sheet in a horizontal plane, and applying to one face of said punched sheet a coating of liquid plastic material to a thickness which upon drying forms a smooth, outwardly flaring, light-reflecting surface symmetrically arranged around each aperture.

ROBERT O. WALKER.

REFERENCES CITED

The following references are of record in the file of this patent:

UNITED STATES PATENTS

| Number | Name | Date |
|---|---|---|
| 998,579 | Herz | July 18, 1911 |
| 1,166,569 | Wright | Jan. 4, 1916 |
| 1,308,468 | Amet | July 1, 1919 |
| 1,804,170 | Lassen | May 5, 1931 |
| 1,878,075 | Walker | Sept. 20, 1932 |
| 1,890,819 | Mandalian | Dec. 13, 1932 |
| 1,966,747 | Zechmanek | July 17, 1934 |
| 2,216,901 | Bodde | Oct. 8, 1940 |
| 2,242,567 | Bodde | May 20, 1941 |
| 2,245,896 | Bodde | June 17, 1941 |
| 2,278,073 | Harkness | Mar. 31, 1942 |

FOREIGN PATENTS

| Number | Country | Date |
|---|---|---|
| 347,282 | Great Britain | Apr. 27, 1931 |